`US009125231B2`

United States Patent
Periyalwar et al.

(10) Patent No.: US 9,125,231 B2
(45) Date of Patent: Sep. 1, 2015

(54) METHODS TO ENABLE SIMULTANEOUS USE OF MULTIPLE RADIO ACCESS TECHNOLOGIES

(71) Applicant: BlackBerry Limited, Waterloo (CA)

(72) Inventors: Shalini Suresh Periyalwar, Waterloo (CA); Atul Asthana, Markham (CA); David Gywn Steer, Nepean (CA); Mark E. Pecen, Waterloo (CA)

(73) Assignee: BlackBerry Limited, Waterloo, Ontario (CA)

( * ) Notice: Subject to any disclaimer, the term of this patent is extended or adjusted under 35 U.S.C. 154(b) by 0 days.

(21) Appl. No.: 14/320,015

(22) Filed: Jun. 30, 2014

(65) Prior Publication Data

US 2014/0315597 A1    Oct. 23, 2014

Related U.S. Application Data (63) Continuation of application No. 13/416,745, filed on Mar. 9, 2012, now Pat. No. 8,805,375.

(51) Int. Cl.
| | | |
|---|---|---|
| *H04W 88/06* | (2009.01) | |
| *H04W 76/02* | (2009.01) | |
| *H04W 36/14* | (2009.01) | |
| *H04W 36/28* | (2009.01) | |

(52) U.S. Cl.
CPC ............ *H04W 88/06* (2013.01); *H04W 76/026* (2013.01); *H04W 36/14* (2013.01); *H04W 36/28* (2013.01)

(58) Field of Classification Search
USPC .................. 455/426.1, 436, 446, 453, 552.1; 370/235, 328, 329, 331, 335
See application file for complete search history.

(56) References Cited

U.S. PATENT DOCUMENTS

| | | |
|---|---|---|
| 6,996,061 B2 | 2/2006 | Yang et al. |
| 8,400,988 B2 | 3/2013 | Liu et al. |
| 2006/0111045 A1 | 5/2006 | Orlassino et al. |
| 2007/0206529 A1 | 9/2007 | Liu et al. |
| 2009/0207820 A1 | 8/2009 | Dimou |
| 2009/0254666 A1 | 10/2009 | Agulnik et al. |

(Continued)

FOREIGN PATENT DOCUMENTS

| | | |
|---|---|---|
| CN | 102056292 A | 5/2011 |
| CN | 102137501 A | 7/2011 |

(Continued)

OTHER PUBLICATIONS

Periyalwar, Shalini Suresh, et al.; U.S. Appl. No. 13/416,745, filed Mar. 9, 2012; Title: Methods to Enable Simultaneous Use of Multiple Radio Access Technologies.

(Continued)

*Primary Examiner* — Sam Bhattacharya
(74) *Attorney, Agent, or Firm* — Conley Rose, P.C.; J. Robert Brown, Jr.

(57) ABSTRACT

A method for communication is provided. The method comprises receiving, by at least one instantiation of a supervisory interface installed on a telecommunications component, a plurality of data streams associated with an application. The method further comprises associating, by the at least one instantiation of the supervisory interface, a first data stream with a first RAT available on the component and a second data stream with a second RAT available on the component.

18 Claims, 8 Drawing Sheets

(56) References Cited

U.S. PATENT DOCUMENTS

2011/0044218 A1   2/2011   Kaur et al.
2013/0150032 A1   6/2013   Pattaswamy et al.

FOREIGN PATENT DOCUMENTS

| GB | 2475157 A | 5/2011 |
|---|---|---|
| TW | 201114293 A | 4/2011 |
| WO | 2006012018 A1 | 2/2006 |
| WO | 2011053827 A1 | 5/2011 |

OTHER PUBLICATIONS

Research in Motion Limited; PCT Application No. PCT/CA2011/050476 filed Aug. 4, 2011; entitled "Methods to Enable Efficient Use of Multiple Radio Access Technologies".

Research in Motion Limited; PCT Application No. PCT/US2011/059633 filed Nov. 7 2011; entitled "System and Method of Encoding and Transmitting Codewords".

Koudouridis, G.P., et al.; "Generic Link Layer Functionality for Multi-Radio Access Networks"; IST Mobile and Wireless Communications Summit 2005; 5 pages.

Dimou, Konstantinos, et al.; "Generic Link Layer: A Solution for Multi-Radio Transmission Diversity in Communication Networks Beyond 3G"; IEEE; 2005; 5 pages.

Choi, Yonghoon, et al.; "Joint Resource Allocation for Parallel Multi-Radio Access in Heterogeneous Wireless Networks"; IEEE; Nov. 2010; 6 pages.

Sachs, Joachim, et al.; "Multi-access Management in Heterogeneous Networks"; Wireless Personal Communications; Nov. 24, 2007; 26 pages.

Office Action dated Sep. 13, 2013; U.S. Appl. No. 13/416,745, filed Mar. 9, 2012; 16 pages.

Notice of Allowance dated Apr. 2, 2014; U.S. Appl. No. 13/416,745, filed Mar. 9, 2012; 11 pages.

PCT International Search Report; Application No. PCT/CA2011/050476; Jan. 26, 2012; 3 pages.

PCT Written Opinion of the International Searching Authority; Application No. PCT/CA2011/050476; Jan. 26, 2012; 4 pages.

European Partial Search Report; Application No. 13157016.0; Jul. 18, 2013; 7 pages.

European Extended Search Report; Application No. 13157016.0; Nov. 5, 2013; 10 pages.

Canadian Office Action; Application No. 2,808,825; Nov. 28, 2014; 4 pages.

Office Action dated Jul. 31, 2014; U.S. Appl. No. 13/636,480, filed Sep. 21, 2012; 20 pages.

Chinese Office Action as Received in Co-pending Application No. 201310071192.0 on Jun. 10, 2015; 7 pages. (No English translation available).

| RAT Name | Static Properties | Dynamic Properties | Active Status | N/D-IRSL pairing |
|---|---|---|---|---|
| RAT 1 | e.g., QoS | e.g., Signal strength, load | Active/Inactive | Yes/No |
| RAT 2 | ... | ... | ... | ... |

Columns labeled: 610, 620, 630, 640

| IRSL Header | Byte count | Source ID* | Destination ID* | Segment No. | Supervisory data |
|---|---|---|---|---|---|

Columns labeled: 710, 720, 730, 740, 750, 760

*optional

| IRSL Header | Byte count | Source ID* | Destination ID* | Segment No. | Application data |
|---|---|---|---|---|---|

Columns labeled: 810, 820, 830, 840, 850, 860

*optional

METHODS TO ENABLE SIMULTANEOUS USE OF MULTIPLE RADIO ACCESS TECHNOLOGIES

This application is a continuation of U.S. patent application Ser. No. 13/416,745 filed Mar. 9, 2012 by Shalini Suresh Periyalwar, et al. entitled, "Methods to Enable Simultaneous Use of Multiple Radio Access Technologies", which is incorporated by reference herein as if reproduced in its entirety.

BACKGROUND

Radio access technologies (RATs) that may be used in wireless telecommunications may include, among others, Global System for Mobile Communications (GSM), General Packet Radio Service (GPRS), Universal Mobile Telecommunications System (UMTS), Universal Terrestrial Radio Access Network (UTRAN), Long Term Evolution (LTE), Code Division Multiple Access (CDMA), and WiFi. In some metropolitan locations, the coverage areas for different types of RATs may overlap. Some wireless devices are equipped with multi-mode radios and/or include multiple radios. For example, a device may have both a GSM/GPRS interface and a UMTS interface. Such a device may be able to provide user services and coverage by choosing one of the RATs in a location where multiple RATs are available.

As used herein, the terms "device" or "wireless device" may refer to portable devices such as mobile telephones, personal digital assistants, handheld computers, laptop computers, tablet computers, or similar devices, but may also refer to devices that are not transportable, such as desktop computers, set-top boxes, network appliances, or similar devices capable of wireless telecommunication. The term "telecommunications component" may be used broadly herein to refer to wireless devices and/or to network elements that may or may not communicate wirelessly. For example, a telecommunications component may be a base station, an eNodeB, a relay, or a similar component that may have a wireless connection to a wireless device or may be a server or a similar component in a core network that has a wired connection to some other component capable of communicating wirelessly.

BRIEF DESCRIPTION OF THE DRAWINGS

For a more complete understanding of this disclosure, reference is now made to the following brief description, taken in connection with the accompanying drawings and detailed description, wherein like reference numerals represent like parts.

DETAILED DESCRIPTION

It should be understood at the outset that although illustrative implementations of one or more aspects of the present disclosure are provided below, the disclosed systems and/or methods may be implemented using any number of techniques, whether currently known or developed in the future. The disclosure should in no way be limited to the illustrative implementations, drawings, and techniques illustrated below, including the example designs and implementations illustrated and described herein, but may be modified within the scope of the appended claims along with their full scope of equivalents.

A multi-mode wireless device may be equipped with two or more mobile radio interfaces, possibly including but not limited to GSM/GPRS, UMTS, UTRAN, LTE, CDMA, and/or WiFi. Such RATs may operate in different bands or, in some cases, different RATs may be operated in adjacent channels of the same band, where a "channel" is a sub-portion of a band that is used by an instantiation of a RAT. Multiple instantiations of a RAT may occupy one band. A band is a region of the spectrum that is typically at least large enough for one instantiation of a RAT and may be large enough for more than one instantiation of the RAT.

Figure 1:
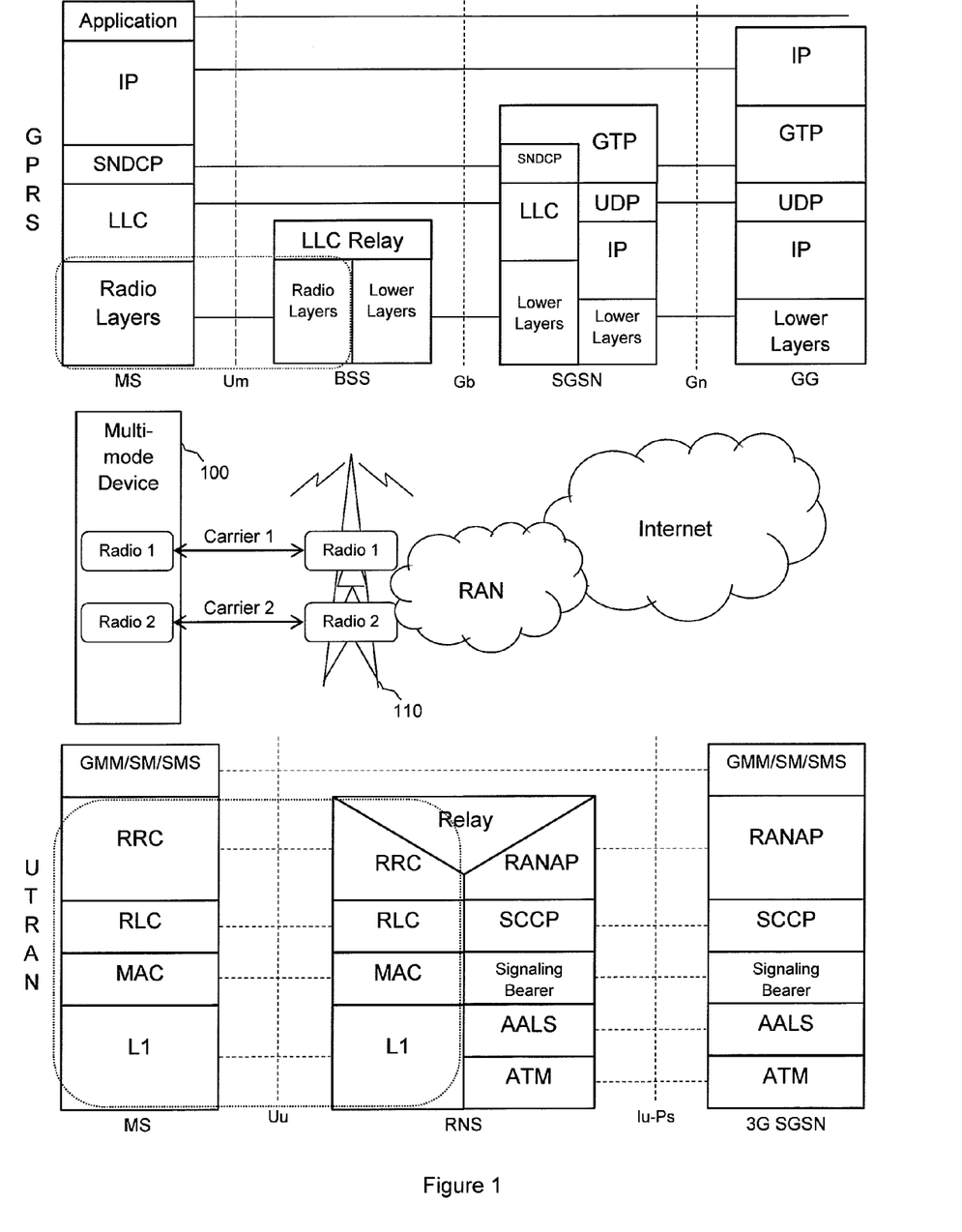
FIG. 1 is a block diagram illustrating a dual-mode wireless device in a wireless network and corresponding protocol diagrams, according to an implementation of the disclosure.

FIG. 1 illustrates an embodiment of a wireless multi-mode device 100 that includes a GPRS system and a UTRAN system as example RATs. In other embodiments, other RATs could be present. Radio link protocol layers are outlined with dotted lines. Each wireless interface in the device 100 has its own protocol stack. At any given time, the device 100 may operate in one of the available modes as determined by the network. The device 100 may, for example, communicate with a base station 110 using one of the RATs (e.g., UTRAN) when available. The second RAT (e.g., GPRS) is also available to the device 100.

While a single RAT communications mode may be the conventional mode of operation, it is possible to have both RATs operating simultaneously and servicing separate calls. For example, such dual-mode communication may be possible with devices that have dual Subscriber Identity Module (SIM) cards. In the conventional operating model, there may be a separate SIM for each RAT and each network. Networks do not traditionally allow a single SIM to be active on multiple RATs and their associated networks. Thus, the combinations of RATs available are restricted to those for which separate SIMs are available and to those that permit multiple RAT access, such as for channel aggregation.

In such dual-SIM devices, each RAT may be mapped to a different SIM. Thus, one SIM/RAT combination may be in a voice call while the other SIM/RAT combination may be used for data services, for example to download a file. In the conventional model, each SIM/RAT combination is associated with one operator or network for providing service. In the case of a device with both a cellular RAT and a WiFi RAT, for example, both RATs may be employed simultaneously. For example, a user can be engaged in a cellular phone call while downloading a file on the WiFi connection. However, such multi-network communication is typically achieved manually, with a user selecting which RATs will be used with which applications.

An application such as a voice call employing a dedicated radio transmission resource may be required to be associated with a dedicated SIM for billing purposes, since charges may be applied per call and per minute of duration. However, for other applications, such as data applications using packet communications, the charges may be applied based on the amount of data that is transmitted. Therefore, multiple data applications need not be exclusively associated with a specific SIM.

The evolution of wireless standards may enable simultaneous use of multiple RATs to service single and multiple applications. While a generic link layer solution for the use of multiple RATs might be considered, the practicality of simultaneous operation with multiple RATs is questionable given the separate standards development processes for each RAT. It may be useful to have an alternate means of enabling communications for one or more applications using multiple RATs simultaneously. It may be preferable that the alternate means not require major modifications to the protocol layers in all the RATs, since such modifications may require standards activity coordinated across separate standards setting organisations. Also, it may be useful to selectively apply the protocols and functions to enable multi-RAT transmission based on the needs and capabilities of the user, application, and/or network.

Embodiments of the present disclosure provide a transparent and flexible overlay layer, known as an Inter-RAT Supervisory Layer (IRSL), to enable the transmission of an application's data via multiple RATs. The IRSL is established above the standardized radio layers and therefore can be implemented without revisions to existing standards. In addition, the multi-RAT transmission protocol may be enabled or disabled on a per-RAT, per-node, or per-application basis. PCT Patent Application Number PCT/CA2011/050476, entitled Methods to Enable Efficient Use of Multiple Radio Access Technologies, by Shalini Periyalwar, Mark Pecen, and David Steer, filed on Aug. 4, 2011, introduces the concept of the IRSL and is incorporated herein by reference for all purposes. The IRSL may be an instantiation of computer-executable instructions and may be referred to more generically herein as a supervisory interface. Background information related to the IRSL will now be summarized to provide context for the embodiments disclosed herein.

Figure 2:
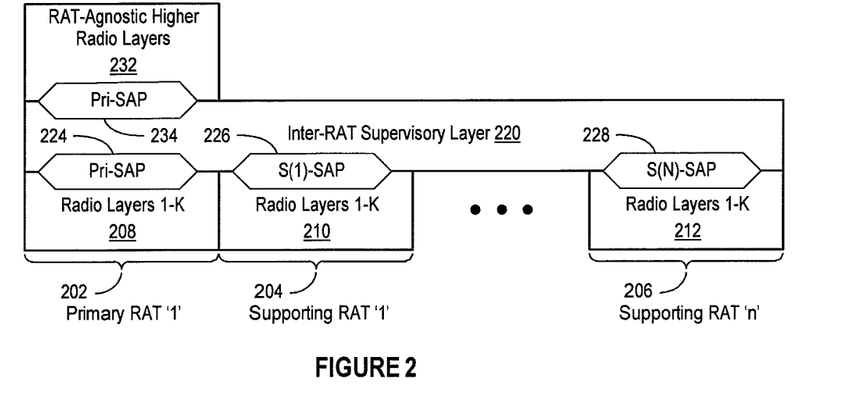
FIG. 2 is a block diagram illustrating an Inter-RAT Supervisory Layer (IRSL) located between two radio layers, according to an implementation of the disclosure.

FIG. 2 illustrates an embodiment of an IRSL 220 that may be implemented to process data for a protocol stack of a Primary RAT '1' 202 and for protocol stacks of Supporting RATs '1' 204 through 'n' 206. In various embodiments, the IRSL 220 is implemented at both ends of a communication link (e.g., a client node and a server node) or at both ends of a radio link with collocated end points (e.g., a client node and an access node). For a given RAT, the IRSL can be optionally turned on or off. The IRSL's utilization of an individual RAT may change over time, and the IRSL may use a different suite of RATs for different applications and at different times. For example, the IRSL may change its RAT utilization according to network costs or delays in transmission or throughput. There may be more than one IRSL active within the device or network node, and the IRSL operations may also be initiated from the network node in support of, for example, downlink services.

An IRSL 220 implemented at a client node, such as a wireless device, may be referred to as a "Device IRSL" (D-IRSL). An IRSL 220 implemented at an access node, such as a network access point, a relay, or an enterprise server, may be referred to as a "Network IRSL" (N-IRSL). As mentioned above, the term "telecommunications component" may be used herein to refer to a client node, an access node, or both.

During communication between the D-IRSL and the N-IRSL, initial setup and periodic or event-driven updates of active RAT status may be performed. In various embodiments, the IRSL 220 spans across multiple available RAT protocol stacks, such as the protocol stacks associated with Primary RAT '1' 202 and Supporting RATs '1' 204 through 'n' 206. The IRSL 220 can be established at any layer above the radio layers "1-K" 208 and the radio layers "1-K" 210 through 212. The radio layers "1-K" 208 correspond to the protocol stack associated with the Primary RAT '1' 202, and the radio layers "1-K" 210 through 212 correspond, respectively, to the protocol stacks associated with the Supporting RATs '1' 204 through 'n' 206. In various embodiments, the implementation of the IRSL 220 is dependent upon individual RAT configurations and whether the RAT end points are collocated.

The IRSL 220 is linked to the RAT-agnostic higher layers 232 of the Primary RAT '1' 202 protocol stack via a standardized Primary Service Access Point (SAP) 234 of the respective layer below it. As a result, the lower layers "1-K" 210 through 212 of the protocol stacks associated with Supporting RATs '1' 204 through 'n' 206 are transparent to the rest of the Primary RAT '1' 202 protocol stack. As shown in FIG. 2, the Primary SAP 234 links the RAT-agnostic higher layers 232 to the IRSL 220, and in turn, the IRSL 220 is linked to Radio Layers "1-K" 208 of the Primary RAT '1' 202 protocol stack by Primary SAP 224. Likewise, the IRSL 220 respectively links the Primary RAT's interfacing layer with the corresponding layer for the radio layers "1-K" 210 through 212 with S(1) SAP 226 through S(n) SAP 228. Accordingly, the higher layers of the supporting RATs are suppressed. The IRSL 220 maintains a list of active RATs in the node and is responsible for monitoring and processing the data packets to and from multiple RATs. In various embodiments, the IRSL 220 may also be responsible for setting up, maintaining, and terminating the links and the protocol stacks associated with Supporting RATs '1' 204 through 'n' 206.

In various embodiments, the IRSL 220 selects the protocol stack associated with the primary RAT '1' 202 and the supporting RATs '1' 204 through 'n' 206 according to link performance (e.g., packet loss rate at the IP layer) or the channel conditions of the radio links, depending on the layer at which the IRSL 220 is applied. In various embodiments, the application in use activates the D-IRSL in the client node, which in turn communicates with the N-IRSL located in the relevant network node. In these and other embodiments, the relevant network node may be a network or application server when the RAT endpoints are not collocated or may be an access node when the RAT endpoints are collocated. In other instances, for example when a client node is communicating directly with another client node, the associated "N-IRSL" will be a "D-IRSL" in the other client node.

Coordination between a D-IRSL and an N-IRSL may be enabled when the client node is powered up and initial network entry (association) procedures are completed using any of the RATs on the client node. Either the D-IRSL or the N-IRSL can query its counterpart to validate its existence. In various embodiments, the information exchanged between the D-IRSL and the N-IRSL establishes the existence of an IRSL on the client node side and the network side. The exchanged information may establish the identity and number of active RATs in the client node and whether the RAT endpoints are collocated at the network side.

In one embodiment, the D-IRSL sends a query to a network node with a list of RATs supported by the IRSL 220. If there is no response within a timeout period, the D-IRSL determines that there is no IRSL 220 present at the network side and does not activate IRSL 220 functionality with that network node. However, if the network node supports IRSL 220 functionality, the network node may respond affirmatively to the query with a sub-list of matching supported RATs. In turn, the D-IRSL compares its supported RATs with the list received from the N-IRSL, which allows the D-IRSL to determine if the RAT endpoints are collocated. For example, the IRSL 220 may be located on the network side in a relay node, a server node, an access node, or all such nodes, depending upon on the location of the RAT end points. In various embodiments, an instantiation of the IRSL 220 is activated when the D-IRSL and N-IRSL handshake is successful.

In one embodiment, the D-IRSL sends a query to the application server running the target application to confirm the presence of an N-IRSL if the D-IRSL has not identified any collocated RATs from the aforementioned procedures. If the response to the query is affirmative, both the N-IRSL and D-IRSL are activated for the specific application running on the application server. The D-IRSL then exchanges with the N-IRSL its list of supported RATs that do not have collocated endpoints, along with their respective IP addresses.

In this way, the D-IRSL is aware of the RATs at the client node, knows if the multiple RATs in the client node have collocated or non-collocated endpoints, and knows if an N-IRSL is enabled at the application server or network nodes. Likewise, the N-IRSL knows if the IRSL 220 is enabled at the client node, is aware of the active RATs with collocated or non-collocated endpoints that a client node is equipped with, and is aware of the client node IP address corresponding to each of the active RATs. It will be appreciated that if a RAT is powered down or inactive (e.g., deregistered), it cannot be used for communication until it is powered up or becomes active.

It will also be appreciated that multiple IRSL 220 instantiations may be activated in the client node depending on the type (e.g., collocated end points or non-collocated end points) of the active RATs. In various embodiments, a client node with, for example, three RATs (e.g., UMTS/HSDPA, GSM/GPRS, and WiFi) can have a first IRSL implemented for a first application in use below the IP layer for the first RAT and second RAT that comprise collocated RATs (e.g., HSDPA, GPRS) and can have a second independent IRSL implemented for a second application in use above the IP layer between the second RAT and the third RAT.

In various embodiments, for uplink transmissions, the IRSL 220 is implemented at the transmitting end as a D-IRSL, and the IRSL 220 is implemented at the receiving end as an N-IRSL. In various other embodiments, for downlink transmissions, the IRSL 220 implemented at the transmitting end is the N-IRSL, and the IRSL 220 implemented at the receiving end is the D-IRSL. The IRSL coordination function can be performed by any peer-to-peer communication application.

Figure 3:
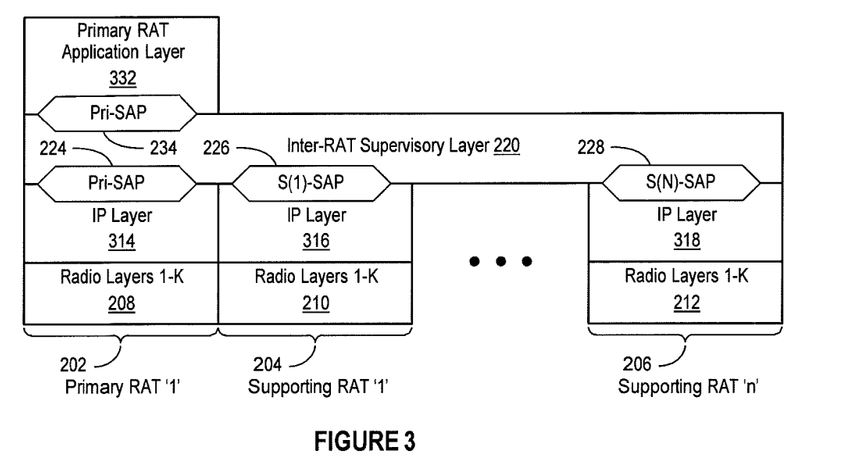
FIG. 3 is a block diagram illustrating an IRSL located between two different radio layers, according to an implementation of the disclosure.
Figure 4:
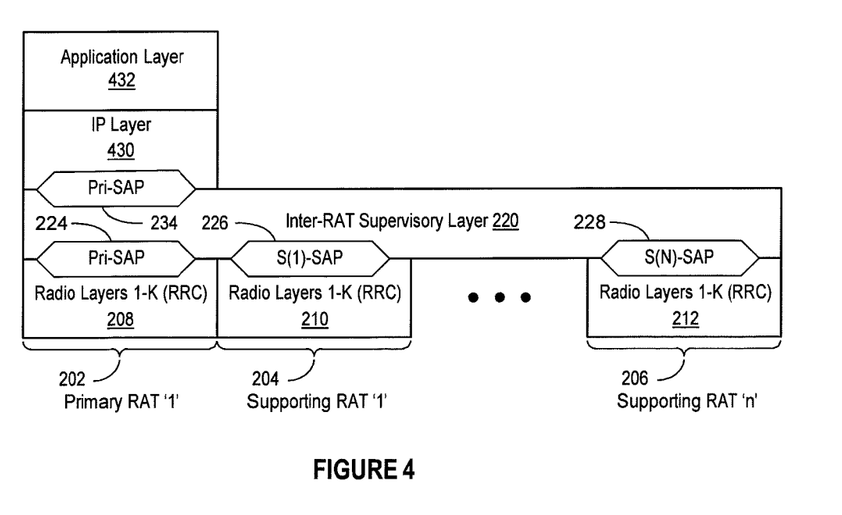
FIG. 4 is a block diagram illustrating an IRSL located between two still different radio layers, according to an implementation of the disclosure.

FIG. 2 depicts the IRSL 220 between the radio layers 208 through 212 and the RAT-agnostic higher radio layers 232, but in other embodiments the IRSL 220 could be located between other layers. For example, in FIG. 3, the IRSL 220 is located between the IP layers 314 through 318 and a primary RAT application layer 332. As another example, FIG. 4 depicts the IRSL 220 between the radio layers 208 through 212 and the IP layer 430.

The introduction of the IRSL between the respective protocol layers of the RATs enables flexible control for the simultaneous use of multiple RATs. When the IRSL is employed to simultaneously transmit data on different RATs, the availability and use of multiple RATs are transparent to the higher layers. There is no requirement for coordination between the participating RATs. Each RAT is independently compliant in its full protocol stack.

In various embodiments of the present disclosure, the IRSL introduced in PCT Patent Application Number PCT/CA2011/050476 referenced above is implemented in the context of simultaneous, or nearly simultaneous, use of multiple RATs for a given application. The term "nearly simultaneously" refers to the fact that, while the multiple RAT interfaces are operating concurrently, the radio transmissions of each individual RAT may not occur at the exact same time due to time sharing/interleaving for inter-radio compatibility requirements or shared apparatus.

A wireless device equipped with multiple radio access technologies, such as GSM/GPRS, UMTS, LTE, and/or WiFi, may be used with various embodiments of the IRSL. Each of these RATs may operate on a different carrier frequency, may have different static and dynamic properties, and may be associated with different subscriptions or wireless operators. For example, there may be multiple instantiations of the same RAT but in different bands or as provided by different networks.

There may be multiple end-to-end data streams with different quality of service (QoS) requirements being originated or terminated at such a device. The data streams may correspond to different applications and services, such as but not restricted to video streaming, file transfer, web browsing, speech services, and/or email. The suitability for multi-RAT transmission may vary depending on the application needs. Multi-RAT transmission may be best suited for certain applications, such as video streaming or large file transfer with fat data streams. It may not be practical to use multi-RAT transmission for other applications such as web page browsing, where simultaneous transmission of components may reduce individual link latency, but where the improvement may be hidden by being restricted by the slowest component. Each individual stream may be optimized with bandwidth aggregation where possible. For example, in Internet interactions, different RATs may be used for different functions such as for uplink of "point-and-clicks" and downlink of new pages to minimize delay and costs.

A simple and lightweight layer in the form of an IRSL is provided herein to facilitate efficient use of multiple RATs with simultaneous, or nearly simultaneous, transmission of an application's packets on multiple RATs. The IRSL serves to match user preferences and application QoS to the properties of the RATs and selects an appropriate RAT or set of RATs for a given application. In one embodiment, the IRSL maintains a list of applications that can best benefit from multi-RAT transmission. In another embodiment, the IRSL receives information from the application or other sources of the services and capabilities required of the RATs. The IRSL functionality may be activated for specific applications that can benefit from multi-RAT transmission. For those applications that do not benefit from multi-RAT transmission, the IRSL may remain a transparent layer.

Figure 5:
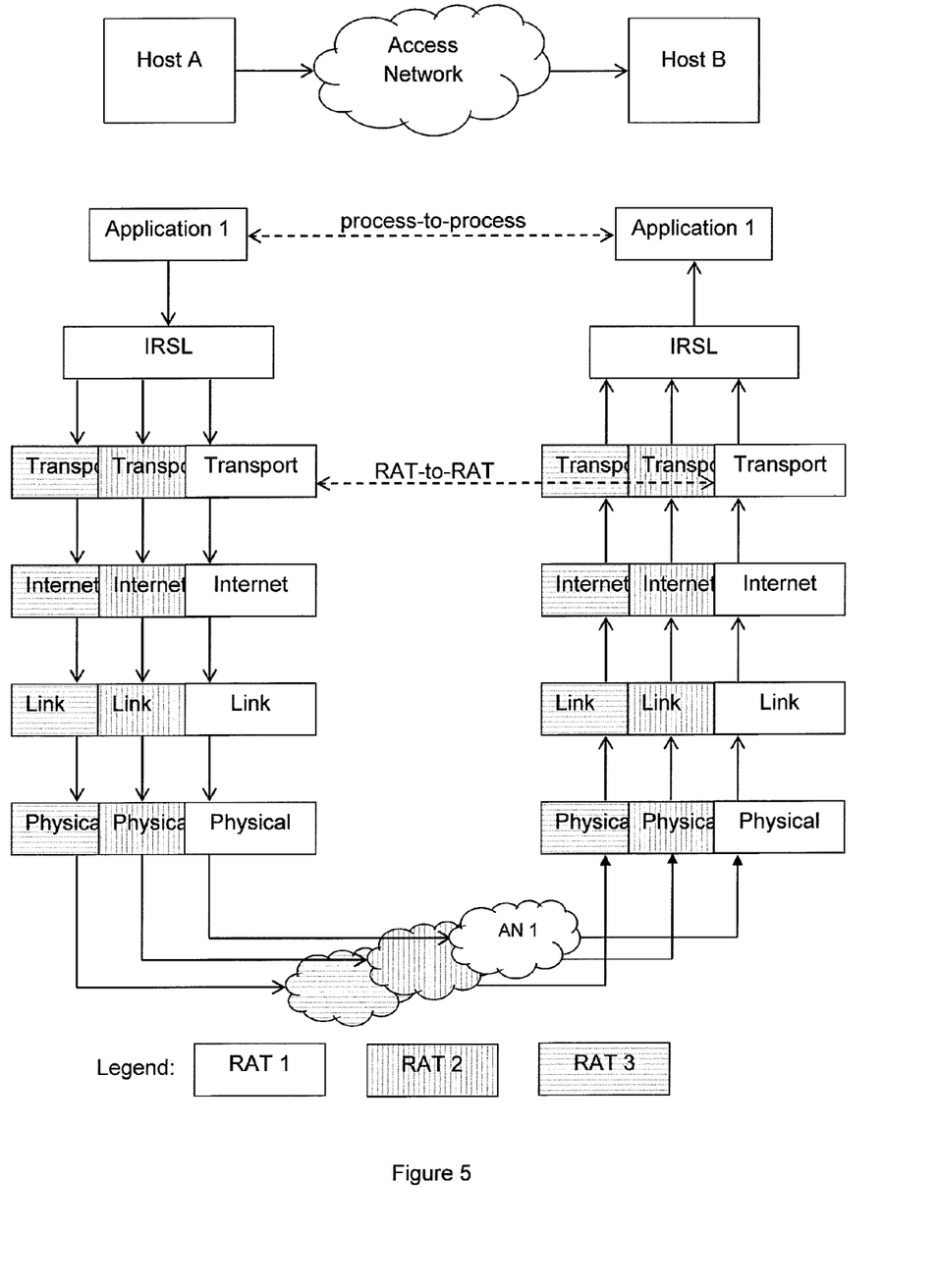
FIG. 5 is a block diagram illustrating an IRSL where application packets are transmitted via three radio access technologies and aggregated at a suitable node in a network, according to an implementation of the disclosure.

FIG. 5 illustrates an implementation of the IRSL below the application layer. In other embodiments, the IRSL may be located above or below different layers in the protocol stack. In this example, an application's packets are distributed among three RATs and aggregated at a suitable node in the network. RAT 1 may be considered a primary RAT, and RAT2 and RAT3 may be supporting RATs. The IRSL operates to assign primary and supporting RATs. Host A applications may be located in a mobile device, for example. The IRSL on the network side for applications may be at a Serving GPRS Support Node (SGSN) or at a server in the network, as examples. Although this illustration shows the IRSL interacting with an IRSL at a peer level in the communications stack, it will be appreciated that this need not always be the case. An IRSL below the Applications level in the device may be designed to detect and interact with an IRSL on the network side below the Transport or Internet layers, for example.

When an application requests a communication link, the IRSL is responsible for assigning the RAT or RATs that best match the application's QoS or other service needs. The service requirements may also optionally be combined with user preferences where available. The IRSL is responsible for distributing the application's data packets to the participating RATs for transmission. Some applications with levels of security may prohibit their traffic being mixed with other traffic or utilizing certain RAT combinations. The IRSL takes these considerations into account when establishing RATs and allocating data among them.

When multiple RATs are used for communicating the packets from a given application, the IRSL at the receiving end is responsible for processing the received data packets from the multiple RATs. That is, the IRSL on the receiving node receives the data packets, collates the data packets, and provides the data packets to an application layer on the receiving node. As many applications are two-way, the flow of packets in the reverse direction may also follow a combination of RATs optimized by the IRSLs at both the device side and the network side. The IRSL RAT selection may be different for the two directions. As there may be several applications involved, there may be several instantiations of the IRSL to manage each application.

In an embodiment, the IRSL maintains a table containing a list of RATs and the properties of the RATs. The IRSL RAT Table may be maintained at each end of the connection (D-IRSL and N-IRSL). When a device is first turned on, the D-IRSL RAT Table comprising a list of available RATs on the device is populated based on the hardware capabilities of the device, the device's subscriptions, and/or the radio signals available in the device's neighborhood. A RAT may be included or excluded from IRSL membership by the user or by the network and its policies or by the current operating conditions and performance. When a RAT is excluded from IRSL membership, the RAT may operate as a stand-alone RAT but does not participate in multi-RAT transmission. A stand-alone RAT can be employed for communications for applications that are not engaged in or do not benefit from multi-RAT transmission. An excluded RAT can also be used for signaling and control operations among the D-IRSL and the N-IRSL.

Figure 6:
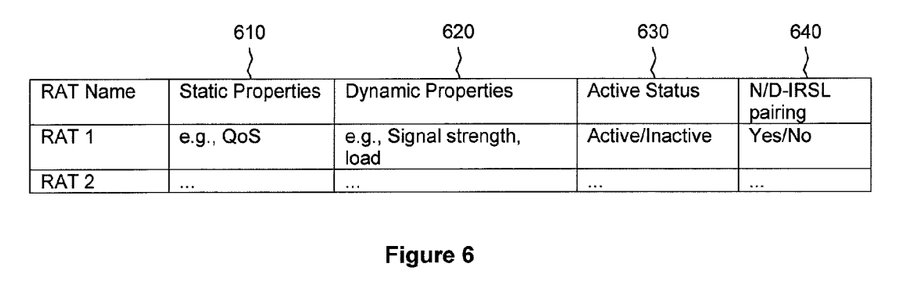
FIG. 6 illustrates an IRSL radio access technology table, according to an implementation of the disclosure.

The D-IRSL RAT Table may contain, among other parameters, the static and dynamic properties for the respective RATs, the active status of the RATs, and/or the N-IRSL support for the RATs. Static properties may include, but are not limited to, the RAT's QoS capabilities (such as bandwidth, throughput, peak rate, packet loss rate, delay, and/or addresses) and, optionally, the subscriber's price plan and security and usage preferences. Dynamic properties may include, but are not limited to, the average load on the associated communications links or network nodes, signal strength, time-of-day pricing offers, and/or location. Dynamic properties may be medium term averages. Since the IRSL enables usage of multiple RATs for a given application, the instantaneous degradation of one RAT will not impact the overall performance of an application. A similar table is maintained at the N-IRSL. When the initial connection protocol for each RAT is completed, the active RAT status in the D-IRSL list is updated. Example table headings for the IRSL RAT Table are given in FIG. 6, and may include, possibly among other headings, static properties 610, dynamic properties 620, active status 630, and/or N/D-IRSL pairing 640.

In some cases, an application may require support by multiple transport layers. When such an application requires support by a combination of transport protocols, the IRSL may direct each transport to the most suitable RAT for that transport.

In some embodiments, the IRSL may include a policy framework for choosing applicable RATs. The IRSL may utilize a suitable policy framework to select the set of RATs for a given application. The policy framework can match the application needs to the properties of the available RATs. The policy framework may be an objective function that may comprise, possibly among other parameters, user profiles, application requirements, pricing information, and/or RAT properties, including measured performance such as speed, delay, and/or application QoS.

When an application requests a communication link, the instantiated IRSL assigns a RAT that best matches the application's service needs, such as QoS, taking into account the static and dynamic properties for the available RATs. This RAT is designated as the primary RAT. The IRSL may further identify additional RATs with active connection to the network. These may be designated as supporting RATs. In some embodiments, the primary RAT may be selected by the application or by network policies. The primary RAT selection may also depend on, possibly among other parameters, location, current network conditions, subscription and roaming agreements, and/or other RATs that may already be active with other services.

In an embodiment, the IRSL may utilize the primary RAT for the control signaling protocol for the application, such as the real-time transport (RTP) protocol. The IRSL may also use the primary RAT for communication to the N-IRSL node. Initially, user data transmission may be started on this link. Subsequently, the IRSL may distribute user data packets to the supporting RATs when the supporting RATs provide benefit for the application, such as higher throughput, lower cost, and/or less delay. It should be noted that a selected primary RAT for one application may serve as a supporting RAT for another application.

Figure 7:
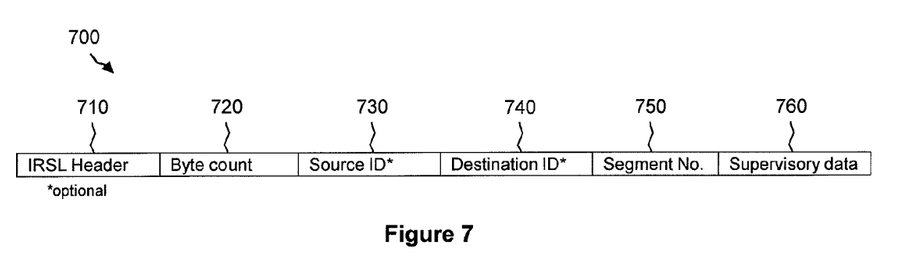
FIG. 7 illustrates an IRSL supervisory frame format, according to an implementation of the disclosure.

For communication between the D-IRSL and the N-IRSL, the IRSL may utilize a "supervisory frame format" (SFF). FIG. 7 illustrates a possible embodiment of an SFF 700. The SFF 700 may include, possibly among other parameters, an IRSL header 710, a byte count 720, an optional source ID 730, an optional destination ID 740, a segment number 750, and supervisory data 760. The IRSL may transmit supervisory packets of the SFF on the subtending RATs. The supervisory packets may be used by the IRSL for various reasons, such as periodically monitoring the performance of supported RATs.

Figure 8:
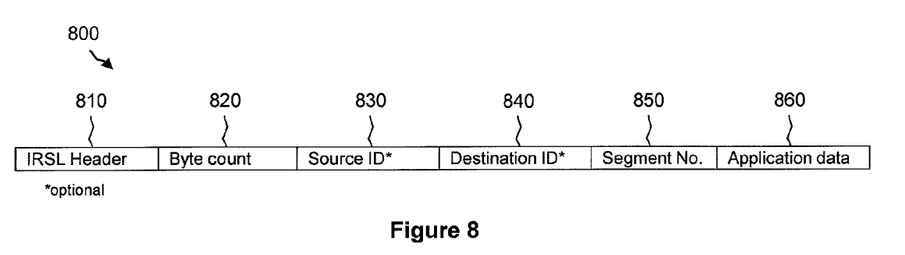
FIG. 8 illustrates an IRSL data frame format, according to an implementation of the disclosure.

For communication of application data packets between the D-IRSL and the N-IRSL, the IRSL may utilize an IRSL "data frame format" (DFF). The IRSL may frame the application data segments before submitting the segments to the RATs. In this way, an individual RAT may support multiple applications, and the corresponding RAT receiver, such as the RAT receiver at the N-IRSL, may allocate the packets to the proper application destination upon reception. One embodiment of an IRSL frame carrying an application data segment as payload is given in FIG. 8. A DFF 800 may include, possibly among other parameters, an IRSL header 810, a byte count 820, an optional source ID 830, an optional destination ID 840, a segment number 850, and application data 860.

Figure 9:
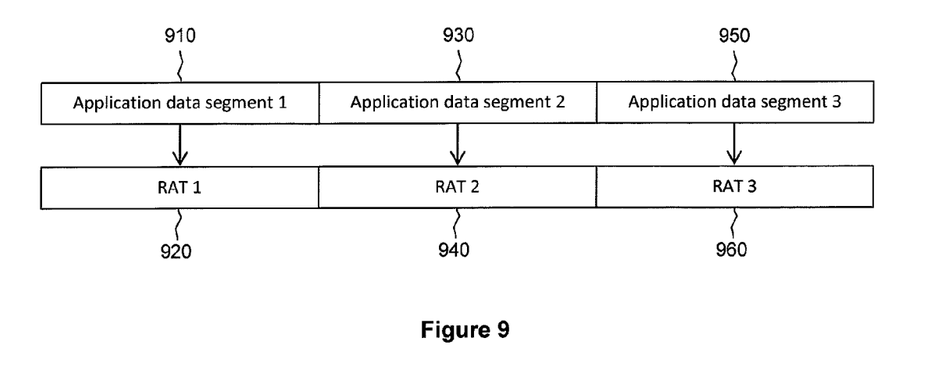
FIG. 9 illustrates an IRSL allocation of application data segments, according to an implementation of the disclosure.

The application data may occur in segments submitted to the different RATs as illustrated in the example of FIG. 9. A first application data segment 910 may be allocated to a first RAT 920, a second application data segment 930 may be allocated to a second RAT 940, and a third application data segment 950 may be allocated to a third RAT 960. In other embodiments, the data segments could be allocated in different ways. For example, the first application data segment 910 and the second application data segment 930 may be allocated to the first RAT 920, and the third application data segment 950 may be allocated to the second RAT 940, or the allocations could be performed in other ways.

In an embodiment, flow control may be used for communication between the D-IRSL and the N-IRSL. The data rate supported on each RAT may be different, as may the link congestion conditions. The length of an application data segment allocated to a RAT may vary depending on the link capability and congestion. Intelligent flow control may be employed at the IRSL to dynamically compensate for congestion and other delays. The application data segment length can be made proportional to the congestion conditions such that the length is smaller for slower links and larger for faster links, so that the packets arrive close to assembly order. For example, if one link is ten times slower than another, the application packets may be split proportionally to compensate for link conditions, with one tenth the traffic going via the slowest link. Under severe conditions, the IRSL may stop using a link if the link's performance falls below a suitable level, for example 10% of the average link performance. In some embodiments, the IRSL may request specific feedback on congestion conditions from the IRSL layer at the receiving node. In other embodiments, the IRSL may make use of congestion information that is exchanged between the transmission end points as specified within the standards for the respective RATs. The application is thereby supported at the aggregate data rate provided by the multiple RATs.

At the transmitting end, once the control signaling for an application is established on the primary RAT, the following process may be used for assigning application packets to the RATs in the case where there are two RATs. In a first step, the first M application layer packets are forwarded to the transport layer of the first active RAT. In a second step, the subsequent N application layer packets are forwarded to the transport layer of the second active RAT. The first and second steps are then repeated in accordance with link conditions on the RATs. The link status and performance can then be communicated with the receiving IRSL.

How M and N are determined may depend on the IRSL policy framework in place. M and N may change over time based on performance and may be selected based on initial or previously measured RAT performance. For example, if the first RAT is twice as fast as the second RAT, M may be twice the size of N. M and N may be altered dynamically based on current averages. If a RAT is supporting multiple applications, the traffic from all of the applications may be taken into account in determining RAT application and performance.

The function of the IRSL at the transmitting end can be summarized as maintaining a RAT Table, assigning RATs to one or more applications requesting transmission, performing flow control, monitoring RAT performance, and transmitting data packets on multiple RATs.

At the receiving end, the application packets are reassembled into application flows and forwarded to the application layer. The IRSL function is transparent to the receiving application. The function of the IRSL at the receiving end (the application end point) following reassembly of application packets can be summarized as examining the received application packets, reordering the packets, forwarding the packets to the application layer, and communicating the link status and performance with the sending IRSL.

Each protocol stack may operate independently of the others. Therefore, retransmission requests may be dealt with at the protocol stack level. The IRSL may be responsible only for reordering the packets before submission to the application layer and properly reordering the packets in a stream that may have been transported over multiple RATs.

Embodiments dealing with handoffs from one cell to another when the IRSL is in use will now be considered. The handoff trigger and handoff procedure are specific to each individual RAT standard. When an application's data is split between two or more RATs, handover on one of the RATs may make it impractical to continue to support the multi-RAT transmission. That is, in the event of a handoff trigger on any one of the participating RATs, configuration changes may be required to continue multi-RAT transmission on other RATs.

In an embodiment, when a handoff trigger occurs on a supporting RAT, data transmission on that RAT is stopped until the handoff procedure is completed for that RAT. When the handoff is successfully completed, the newly re-established RAT connection may be reassigned to a user data stream if the new connection's properties are deemed by the IRSL to continue to be appropriate. During handoff on a supporting RAT, data transmission continues on the primary RAT and on the remaining supporting RATs involved in the transmission. The IRSL may need to be aware that handoffs may occur on more than one RAT at the same, or nearly the same, time.

In an embodiment, when a handoff trigger occurs on the primary RAT, data transmission on the primary RAT and the supporting RATs is suspended and the handoff is processed on the primary RAT as defined by the primary RAT's procedures and interface to the upper layers. Once the handoff is completed, the data transmission resumes on the primary RAT and possibly also on the supporting RATs as the supporting RATs are subsequently recovered and are added by the IRSL to support the ongoing transmission.

Figure 10:
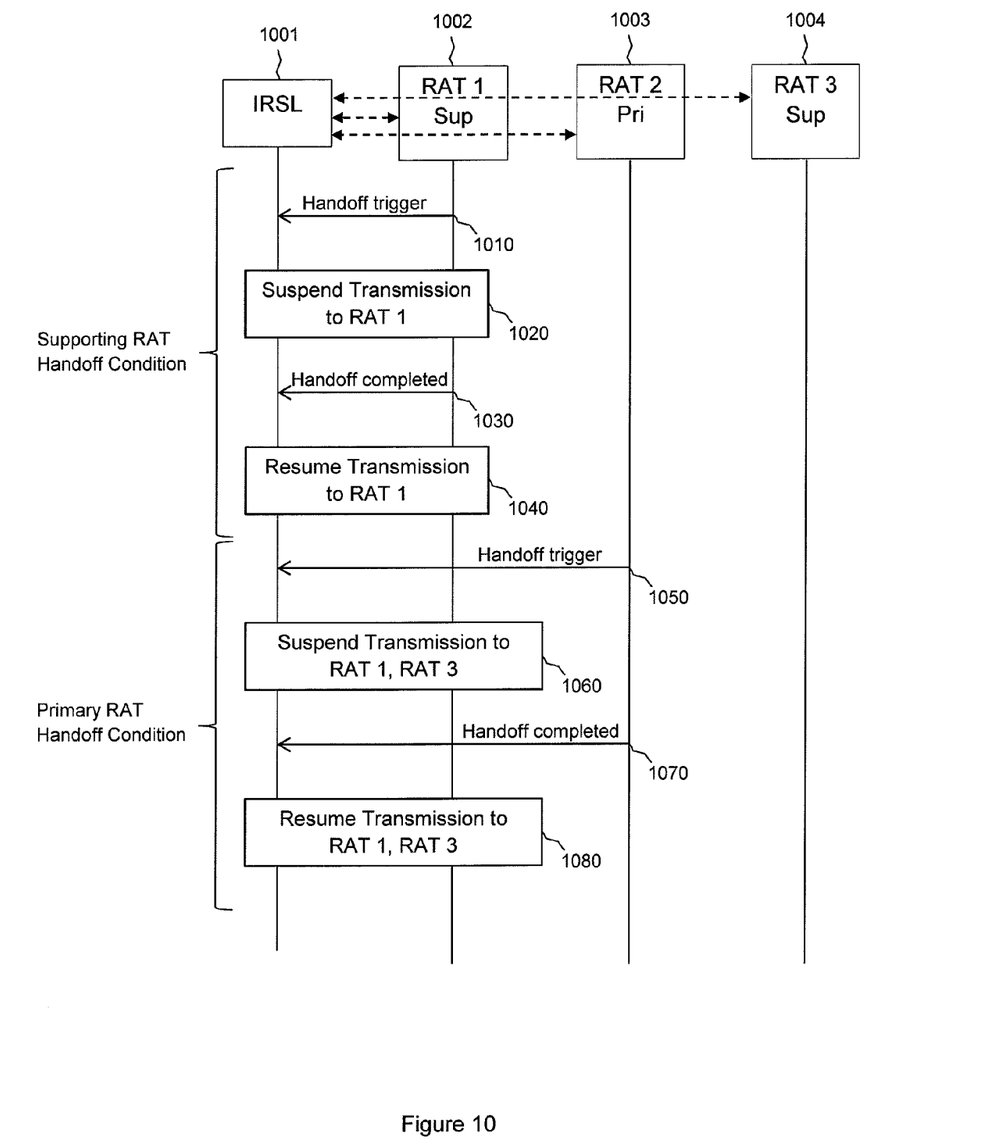
FIG. 10 is a block diagram illustrating a multiple radio access technology data transmission procedure during a handoff, according to an implementation of the disclosure.

An embodiment of such a multi-RAT data transmission procedure during handoff is summarized in FIG. 10. At event 1010, a handoff trigger is sent from a first supporting RAT 1002 to the IRSL 1001. At event 1020, transmissions to the first supporting RAT 1002 are suspended. At event 1030, the handoff is completed. At event 1040, transmissions to the first supporting RAT 1002 are resumed. At event 1050, a handoff trigger is sent from the primary RAT 1003 to the IRSL 1001. At event 1060, transmissions to the first supporting RAT 1002 and a second supporting RAT 1004 are suspended. At event 1070, the handoff is completed. At event 1080, transmissions to the first supporting RAT 1002 and the second supporting RAT 1004 are resumed.

In an alternative embodiment, even if the primary RAT is in a handoff, the IRSL may continue to accept packets for transmission using the supporting RATs. One option is to convert one of the supporting RATs to a primary RAT and to make the current primary RAT a supporting RAT. However, the IRSL may need to report to the application layer, using the primary RAT protocol if required, when all of the RATs have entered a handover condition and no additional packets can be accepted. The RATs and corresponding cell coverage may be chosen in such a manner that there is no interruption to the data transfer for handoff transitions among cell coverage areas.

In additional embodiments, the IRSL can be applied in various scenarios. One example is the use of the IRSL for aggregating opportunistic spectrum with licensed spectrum. Such aggregation may occur, for example, in the context of relays, home node-Bs, femto-cells, or similar components, any of which may be referred to hereinafter as a node. In such an embodiment, the availability of a "pool" of available RATs for utilization by the IRSL may be dynamically updated as location and channel conditions change. Based on application needs, a node may monitor for the availability of opportunistic spectrum. If such spectrum is available, the node may inform the IRSL that a RAT with opportunistic spectrum is available with reported properties, such as cost, delay, range, and/or data rate, and may be used for transmissions. The node may then include the opportunistic RAT allocation in the RAT pool for suitable applications.

In another additional embodiment, the IRSL may also be employed to couple an available wireless communication interface with other communications connectivity on a device, such as USB or other high speed interfaces. In such an embodiment, the data from an application or service may be transported over one or more of the available RATs as well as over a wired channel, such as a USB channel. In some of these embodiments, the end point of the link may be a storage device such as a disk unit or a memory card or a printer. When both opportunistic spectrum and licensed spectrum are used, the integration of packets sent to the application layer may be ensured by the IRSL. For example, the IRSL might direct some packets to opportunistic spectrum access (OSA) and direct other packets to a wide area network (WAN) RAT. With this approach, the WAN standard need not be changed.

The IRSL is a lightweight overlay protocol that can be used together with existing RATs without requiring changes to the RATs or to the communications protocols or standards. The IRSL may be applied flexibly based on a variety of criteria, such as application, service, data packet requirement, and RAT capability. Although the examples provided herein may refer to the use of multiple RATs and bands, the embodiments can also be applied to multiple carriers with the same RAT, either within a band or across bands or across different release versions of the RAT available for use in the network and the device. The IRSL can also be implemented with carrier aggregation within a single RAT. The primary RAT carries the application's control protocol and some of the application's data packets while the dynamically allocated supplementary RATs carry portions of the packet flows based on the service requirements of the flows and the features of the RATs. The primary RAT and the supporting RATs may be designated per application, and multiple applications may utilize different RAT combinations. Thus, each active application may have different primary and supporting RATs. The IRSL is a flexible software instantiation that can be turned on or off for a user or RAT or application. For example, applications that are not suited to multi-RAT transmission can bypass the IRSL. Similarly, some of the RATs may be conveniently excluded from the IRSL for various reasons. Also, the use of multiple radio links is transparent to the application as well as to the participating radio links. Flow control and handoff issues related to multi-radio transmission of a single application's data packets are also addressed by aspects of the disclosure. In addition, opportunistic channels are simply accommodated by the IRSL process.

Figure 11:
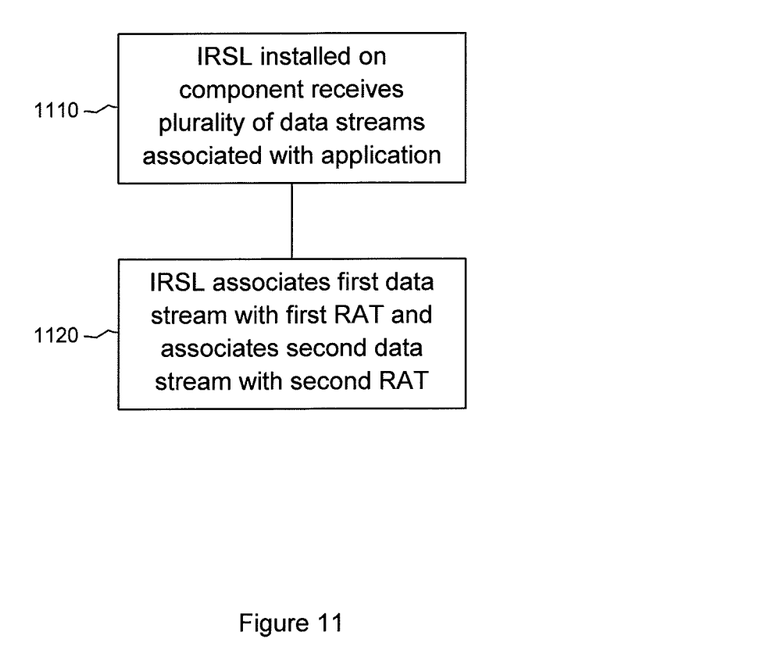
FIG. 11 is a flowchart for a method for communication in a wireless telecommunications system, according to an implementation of the disclosure.

FIG. 11 illustrates an embodiment of a method for communication. At box 1110, at least one instantiation of an IRSL installed on a telecommunications component receives a plurality of data streams associated with an application. At box 1120, the at least one instantiation of the IRSL associates a first data stream with a first RAT available on the component and associates a second data stream with a second RAT available on the component.

As mentioned above, the implementations described herein may be implemented by mobile telephones, personal digital assistants, handheld computers, laptop computers, tablet computers, or other types of devices. An example of such a device is described below with regard to FIG. 12. Device 3200 may comprise a two-way wireless communication device having voice and data communication capabilities. In some embodiments, voice communication capabilities are optional. The device 3200 generally has the capability to communicate with other computer systems on the Internet. Depending on the exact functionality provided, the device may be referred to as a data messaging device, a two-way pager, a wireless e-mail device, a cellular telephone with data messaging capabilities, a wireless Internet appliance, a wireless device, a smart phone, a mobile device, or a data communication device, as examples.

Figure 12:
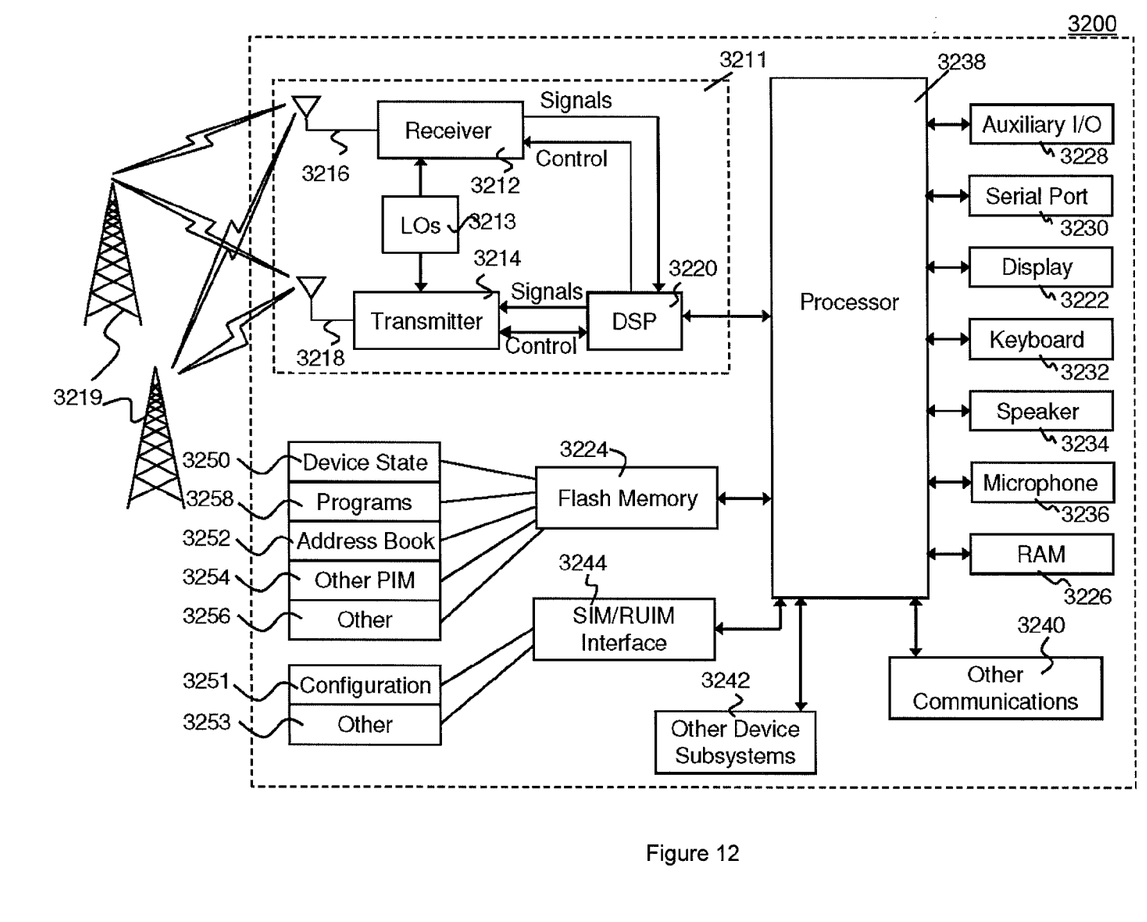
FIG. 12 illustrates a wireless device suitable for implementing the several aspects of the present disclosure.

It should be noted that FIG. 12 shows a device with a single radio system 3211, but multiple radio systems 3211 may be present. That is, FIG. 12 depicts the traditional device configuration with only a single radio supporting a single service at any one time. The embodiments disclosed herein deal with devices that contain multiple radio systems 3211 and in which multiple radios may be active simultaneously, or nearly simultaneously. FIG. 1, for example, shows a multi-mode device with two radios. The IRSL described herein and operating, for example, inside the processor 3238, may interact with multiple instantiations of the radios 3211 (and/or other communications interfaces 3240). It is these multiple radio instantiations that provide the multiple RATs that the IRSL supervises. In some embodiments, the radio system 3211, or some parts of it, may be software defined and able to be reconfigured to support multiple different RATs, either simultaneously or nearly simultaneously. Some of the elements in the radio system 3211 may be shared across the multiple RATs, for example, the local oscillators and the antennas.

Where the device 3200 is enabled for two-way communication, it may incorporate a communication subsystem 3211, including a receiver 3212 and a transmitter 3214, as well as associated components such as one or more antenna elements 3216 and 3218, local oscillators (LOs) 3213, and a processing module such as a digital signal processor (DSP) 3220. The particular design of the communication subsystem 3211 may be dependent upon the communication network in which the device 3200 is intended to operate.

Network access requirements may also vary depending upon the type of network 3219. In some networks, network access is associated with a subscriber or user of the device 3200. The device 3200 may require a removable user identity module (RUIM) or a subscriber identity module (SIM) card in order to operate on a network. The SIM/RUIM interface 3244 is typically similar to a card slot into which a SIM/RUIM card may be inserted. The SIM/RUIM card may have memory and may hold many key configurations 3251 and other information 3253, such as identification and subscriber-related information.

When required network registration or activation procedures have been completed, the device 3200 may send and receive communication signals over the network 3219. As illustrated, the network 3219 may consist of multiple base stations communicating with the device 3200.

Signals received by antenna 3216 through communication network 3219 are input to receiver 3212, which may perform such common receiver functions as signal amplification, frequency down conversion, filtering, channel selection, and the like. Analog to digital (A/D) conversion of a received signal allows more complex communication functions, such as demodulation and decoding to be performed in the DSP 3220. In a similar manner, signals to be transmitted are processed, including modulation and encoding for example, by DSP 3220 and are input to transmitter 3214 for digital to analog (D/A) conversion, frequency up conversion, filtering, amplification, and transmission over the communication network 3219 via antenna 3218. DSP 3220 not only processes communication signals but also provides for receiver and transmitter control. For example, the gains applied to communication signals in receiver 3212 and transmitter 3214 may be adaptively controlled through automatic gain control algorithms implemented in DSP 3220.

The device 3200 generally includes a processor 3238 which controls the overall operation of the device. Communication functions, including data and voice communications, are performed through communication subsystem 3211. Processor 3238 also interacts with further device subsystems such as the display 3222, flash memory 3224, random access memory (RAM) 3226, auxiliary input/output (I/O) subsystems 3228, serial port 3230, one or more keyboards or keypads 3232, speaker 3234, microphone 3236, other communication subsystem 3240 such as a short-range communications subsystem, and any other device subsystems generally designated as 3242. Serial port 3230 may include a USB port or other port currently known or developed in the future.

Some of the illustrated subsystems perform communication-related functions, whereas other subsystems may provide "resident" or on-device functions. Notably, some subsystems, such as keyboard 3232 and display 3222, for example, may be used for both communication-related functions, such as entering a text message for transmission over a communication network, and device-resident functions, such as a calculator or task list.

Operating system software used by the processor 3238 may be stored in a persistent store such as flash memory 3224, which may instead be a read-only memory (ROM) or similar storage element (not shown). The operating system, specific device applications, or parts thereof, may be temporarily loaded into a volatile memory such as RAM 3226. Received communication signals may also be stored in RAM 3226.

As shown, flash memory 3224 may be segregated into different areas for both computer programs 3258 and program data storage 3250, 3252, 3254 and 3256. These different storage types indicate that each program may allocate a portion of flash memory 3224 for their own data storage requirements. Processor 3238, in addition to its operating system functions, may enable execution of software applications on the device 3200. A predetermined set of applications that control basic operations, including at least data and voice communication applications for example, may typically be installed on the device 3200 during manufacturing. Other applications may be installed subsequently or dynamically.

Applications and software may be stored on any computer-readable storage medium. The computer-readable storage medium may be tangible or in a transitory/non-transitory medium such as optical (e.g., CD, DVD, etc.), magnetic (e.g., tape), or other memory currently known or developed in the future.

One software application may be a personal information manager (PIM) application having the ability to organize and manage data items relating to the user of the device such as, but not limited to, e-mail, calendar events, voice mails, appointments, and task items. One or more memory stores may be available on the device to facilitate storage of PIM data items. Such a PIM application may have the ability to send and receive data items via the wireless network 3219. Further applications may also be loaded onto the device 3200 through the network 3219, an auxiliary I/O subsystem 3228, serial port 3230, short-range communications subsystem 3240, or any other suitable subsystem 3242, and installed by a user in the RAM 3226 or a non-volatile store (not shown) for execution by the processor 3238. Such flexibility in application installation may increase the functionality of the device 3200 and may provide enhanced on-device functions, communication-related functions, or both. For example, secure communication applications may enable electronic commerce functions and other such financial transactions to be performed using the device 3200.

In a data communication mode, a received signal such as a text message or web page download may be processed by the communication subsystem 3211 and input to the processor 3238, which may further process the received signal for output to the display 3222, or alternatively to an auxiliary I/O device 3228.

A user of device 3200 may also compose data items, such as email messages for example, using the keyboard 3232, which may be a complete alphanumeric keyboard or telephone-type keypad, among others, in conjunction with the display 3222 and possibly an auxiliary I/O device 3228. Such composed items may then be transmitted over a communication network through the communication subsystem 3211.

For voice communications, overall operation of the device 3200 is similar, except that received signals may typically be output to a speaker 3234 and signals for transmission may be generated by a microphone 3236. Alternative voice or audio I/O subsystems, such as a voice message recording subsystem, may also be implemented on the device 3200. Although voice or audio signal output may be accomplished primarily through the speaker 3234, display 3222 may also be used to provide an indication of the identity of a calling party, the duration of a voice call, or other voice call-related information, for example.

Serial port 3230 may be implemented in a personal digital assistant (PDA)-type device for which synchronization with a user's desktop computer (not shown) may be desirable, but such a port is an optional device component. Such a port 3230 may enable a user to set preferences through an external device or software application and may extend the capabilities of the device 3200 by providing for information or software downloads to the device 3200 other than through a wireless communication network. The alternate download path may, for example, be used to load an encryption key onto the device 3200 through a direct and thus reliable and trusted connection to thereby enable secure device communication. Serial port 3230 may further be used to connect the device to a computer to act as a modem.

Other communications subsystems 3240, such as a short-range communications subsystem, are further optional components which may provide for communication between the device 3200 and different systems or devices, which need not necessarily be similar devices. For example, the subsystem 3240 may include an infrared device and associated circuits and components or a Bluetooth™ communication module to provide for communication with similarly enabled systems and devices. Subsystem 3240 may further include non-cellular communications such as WiFi, WiMAX, near field communication (NFC), and/or radio frequency identification (RFID). The other communications element 3240 may also be used to communicate with auxiliary devices such as tablet displays, keyboards or projectors.

Figure 13:
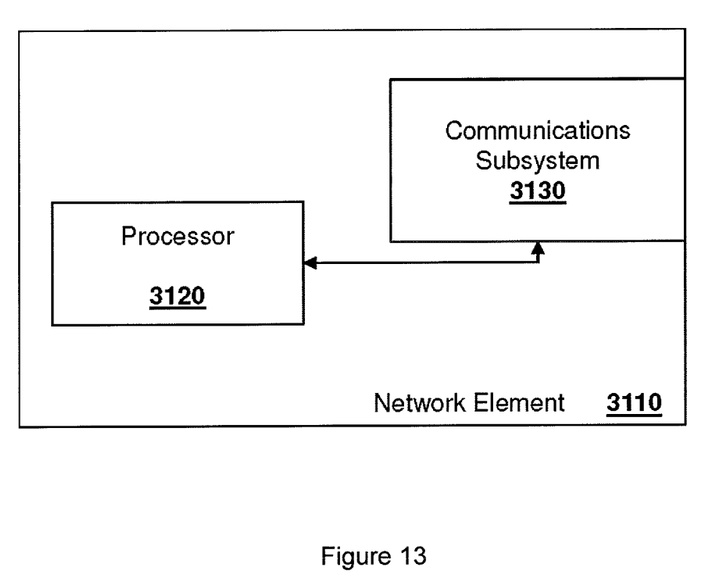
FIG. 13 illustrates a network element suitable for implementing the several aspects of the present disclosure.

The IRSL may also be implemented by a network element. A simplified network element is shown with regard to FIG. 13. In FIG. 13, network element 3110 includes a processor 3120 and a communications subsystem 3130, where the processor 3120 and communications subsystem 3130 cooperate to perform the methods described above.

In an implementation, a telecommunications component is provided. The component comprises a processor configured to execute instructions that instantiate at least one supervisory interface configured to associate a first data stream associated with an application with a first RAT or other communications technology available on the component and to associate a second data stream associated with the application with a second RAT or other communications technology available on the component.

In another implementation, a method for communication is provided. The method comprises receiving, by at least one instantiation of a supervisory interface installed on a telecommunications component, a plurality of data streams associated with an application. The method further comprises associating, by the at least one instantiation of the supervisory interface, a first data stream with a first RAT available on the component and a second data stream with a second RAT available on the component.

While several implementations have been provided in the present disclosure, it should be understood that the disclosed systems and methods may be embodied in many other specific forms without departing from the spirit or scope of the present disclosure. The present examples are to be considered as illustrative and not restrictive, and the intention is not to be limited to the details given herein. For example, the various elements or components may be combined or integrated in another system or certain features may be omitted, or not implemented.

Also, techniques, systems, subsystems and methods described and illustrated in the various implementations as discrete or separate may be combined or integrated with other systems, modules, techniques, or methods without departing from the scope of the present disclosure. Other items shown or discussed as coupled or directly coupled or communicating with each other may be indirectly coupled or communicating through some interface, device, or intermediate component, whether electrically, mechanically, or otherwise. Other examples of changes, substitutions, and alterations are ascertainable by one skilled in the art and may be made without departing from the spirit and scope disclosed herein.

What is claimed is:

1. A mobile device comprising:
a processor configured to execute instructions that instantiate at least one supervisory interface configured to associate a first data stream associated with a first application with a first radio access technology (RAT) available on the mobile device and to associate a first portion of a second data stream associated with a second application with the first RAT and a second portion of the second data stream associated with the second application with a second RAT available on the mobile device.

2. The mobile device of claim 1, wherein the supervisory interface instantiation on a transmitting component of the mobile device associates the data streams of the first and second applications with the first and second RATs based on compatibility of transmission requirements of the first and second applications with capabilities of the first and second RATs.

3. The mobile device of claim 2, wherein the supervisory interface instantiation on the transmitting component distributes data packets of the first and second portions of the second data stream in proportion to available bandwidth and the capabilities of the first and second RATs.

4. The mobile device of claim 3, wherein a supervisory interface instantiation on a receiving device receives the data packets, collates the data packets, and provides the data packets to an application layer on the receiving device.

5. The mobile device of claim 2, wherein the supervisory interface assigns one of the RATs to be a primary RAT and assigns the other RAT to be a supporting RAT, the assignments of the primary and supporting RATs based on the capabilities of the primary RAT to meet the transmission requirements of the application being superior to the capabilities of the supporting RAT to meet the transmission requirements of the application.

6. The mobile device of claim 5, wherein the supervisory interface assigns the primary RAT for transmitting control signaling and initial data transmissions, and wherein the supervisory interface assigns the supporting RAT for transmitting subsequent data transmissions.

7. A method for communication comprising:
instantiating at least one supervisory interface configured to associate a first data stream associated with a first application with a first radio access technology (RAT) and to associate a first portion of a second data stream associated with a second application with the first RAT and a second portion of the second data stream associated with the second application with a second RAT.

8. The method of claim 7, wherein the supervisory interface instantiation associates the data streams of the first and second applications with the first and second RATs based on compatibility of transmission requirements of the first and second applications with capabilities of the first and second RATs.

9. The method of claim 8, wherein the supervisory interface instantiation distributes data packets of the first and second portions of the second data stream in proportion to available bandwidth and the capabilities of the first and second RATs.

10. The method of claim 9, further comprising instantiating a supervisory interface on a receiving device that receives the data packets, collates the data packets, and providing the data packets to an application layer on the receiving device.

11. The method of claim 8, wherein the supervisory interface assigns one of the RATs to be a primary RAT and assigns the other RAT to be a supporting RAT, the assignments of the primary and supporting RATs based on the capabilities of the primary RAT to meet the transmission requirements of the application being superior to the capabilities of the supporting RAT to meet the transmission requirements of the application.

12. The method of claim 11, wherein the supervisory interface assigns the primary RAT for transmitting control signaling and initial data transmissions, and wherein the supervisory interface assigns the supporting RAT for transmitting subsequent data transmissions.

13. A non-transitory computer readable medium comprising instructions that when executed:
instantiate at least one supervisory interface configured to associate a first data stream associated with a first application with a first radio access technology (RAT) and to associate a first portion of a second data stream associated with a second application with the first RAT and a second portion of the second data stream associated with the second application with a second RAT.

14. The non-transitory computer readable medium of claim 13, wherein the supervisory interface instantiation associates the data streams of the first and second applications with the first and second RATs based on compatibility of transmission requirements of the first and second applications with capabilities of the first and second RATs.

15. The non-transitory computer readable medium of claim 14, wherein the supervisory interface instantiation distributes data packets of the first and second portions of the second data stream in proportion to available bandwidth and the capabilities of the first and second RATs.

16. The non-transitory computer readable medium of claim 15, wherein a supervisory interface is instantiated on a receiving device receives the data packets, collates the data packets, and provides the data packets to an application layer on the receiving device.

17. The non-transitory computer readable medium of claim 14, wherein the supervisory interface assigns one of the RATs to be a primary RAT and assigns the other RAT to be a supporting RAT, the assignments of the primary and supporting RATs based on the capabilities of the primary RAT to meet the transmission requirements of the application being superior to the capabilities of the supporting RAT to meet the transmission requirements of the application.

18. The non-transitory computer readable medium of claim 17, wherein the supervisory interface assigns the primary RAT for transmitting control signaling and initial data transmissions, and wherein the supervisory interface assigns the supporting RAT for transmitting subsequent data transmissions.

\* \* \* \* \*